United States Patent
Olsen et al.

(10) Patent No.: US 7,297,917 B2
(45) Date of Patent: Nov. 20, 2007

(54) READOUT TECHNIQUE FOR INCREASING OR MAINTAINING DYNAMIC RANGE IN IMAGE SENSORS

(75) Inventors: Espen A. Olsen, Oslo (NO); Jorgen Moholt, Moss (NO)

(73) Assignee: Micron Technology, Inc., Boise, ID (US)

( * ) Notice: Subject to any disclaimer, the term of this patent is extended or adjusted under 35 U.S.C. 154(b) by 221 days.

(21) Appl. No.: 11/088,964

(22) Filed: Mar. 24, 2005

(65) Prior Publication Data

US 2006/0214085 A1   Sep. 28, 2006

(51) Int. Cl.
*H04N 5/335* (2006.01)
*H01L 27/00* (2006.01)

(52) U.S. Cl. .............. 250/208.1; 250/214 A; 250/214 AG; 250/214 DC; 348/300; 330/110

(58) Field of Classification Search ........ 250/208.1, 250/214 R, 214 A, 214 LA, 214 DC; 348/300, 348/301; 330/59, 110, 308
See application file for complete search history.

(56) References Cited

U.S. PATENT DOCUMENTS

| | | | |
|---|---|---|---|
| 5,614,948 A | 3/1997 | Hannah | |
| 6,073,848 A * | 6/2000 | Giebel | ............ 235/462.26 |
| 6,140,630 A | 10/2000 | Rhodes | |
| 6,204,524 B1 | 3/2001 | Rhodes | |
| 6,310,366 B1 | 10/2001 | Rhodes et al. | |
| 6,326,652 B1 | 12/2001 | Rhodes | |
| 6,333,205 B1 | 12/2001 | Rhodes | |
| 6,376,868 B1 | 4/2002 | Rhodes | |
| 6,538,593 B2 | 3/2003 | Yang et al. | |
| 6,734,905 B2 | 5/2004 | Fossum et al. | |

* cited by examiner

*Primary Examiner*—Kevin Pyo
(74) *Attorney, Agent, or Firm*—Dickstein Shapiro LLP

(57) ABSTRACT

The apparatus and method provide a readout technique and circuit for increasing or maintaining dynamic range of an image sensor. The readout technique and circuit process each pixel individually based on the magnitude of the readout signal. The circuit includes a gain amplifier amplifying the readout analog signal, a level detection circuit for determining the signal's magnitude, a second gain amplifier applying a gain based on the signal magnitude and an analog-to-digital converter digitizing the signal and a circuit for multiplying or dividing the signal. The method and circuit allow for a lower signal-to-noise ratio while increasing the dynamic range of the imager.

17 Claims, 4 Drawing Sheets

READOUT TECHNIQUE FOR INCREASING OR MAINTAINING DYNAMIC RANGE IN IMAGE SENSORS

FIELD OF THE INVENTION

The invention relates to an image sensor and more particularly to a readout technique and circuit for increasing or maintaining dynamic range in an image sensor.

BACKGROUND OF THE INVENTION

Imaging devices, including charge coupled devices (CCD) and complementary metal oxide semiconductor (CMOS) imagers, are commonly used in photo-imaging applications.

A CMOS imager circuit includes a pixel array, each one of the pixels including a photosensor which may be one of a photogate, photoconductor or a photodiode overlying a substrate for accumulating photo-generated charge in the underlying portion of the substrate. A readout circuit is connected to each pixel and includes at least an output field effect transistor formed in the substrate and a charge transfer section formed on the substrate adjacent the photogate, photoconductor or photodiode having a sensing node, typically a floating diffusion node, connected to the gate of an output transistor. The imager may include at least one electronic device such as a transistor for transferring charge from the underlying portion of the substrate to the floating diffusion node and one device, also typically a transistor, for resetting the node to a predetermined level prior to charge transference.

In a CMOS imager, the active elements of a pixel perform the necessary functions of: (1) photon to charge conversion; (2) accumulation of image charge; (3) transfer of charge to the floating diffusion node; (4) resetting the floating diffusion node to a known state before the transfer of charge to it; (5) selection of a pixel for readout; and (6) output and amplification of a signal representing pixel charge. Photo charge may be amplified when it moves from the initial charge accumulation region to the floating diffusion node. CMOS imagers of the type discussed above are generally known as discussed, for example, in U.S. Pat. Nos. 6,140, 630, 6,376,868, 6,310,366, 6,326,652, 6,204,524, 6,333,205, assigned to Micron Technology, Inc., which are incorporated by reference in their entirety.

FIG. 1 illustrates a block diagram for a CMOS imager 10. The imager 10 includes a pixel array 20. The pixel array 20 comprises a plurality of pixels arranged in a predetermined number of columns and rows. The pixels of each row in array 20 are all turned on at the same time by a row select line and the pixels of each column are selected for output by a column select line. A plurality of row and column lines are provided for the entire array 20.

The row lines are selectively activated by the row driver 32 in response to row address decoder 30 and the column select lines are selectively activated by the column driver 36 in response to column address decoder 34. Thus, a row and column address is provided for each pixel. The CMOS imager 10 is operated by the control circuit 41, which controls address decoders 30, 34 for selecting the appropriate row and column lines for pixel readout, and row and column driver circuitry 32, 36, which apply driving voltage to the drive transistors of the selected row and column lines.

Each column contains sample and hold circuitry (S/H) 38 comprising sampling and holding capacitors and switches associated with the column driver 36 that read and store a pixel reset signal $V_{rst}$ and a pixel image signal $V_{sig}$ for selected pixels. A differential signal ($V_{rst}$-$V_{sig}$) is produced by differential amplifier 40 for each pixel, which is digitized by analog-to-digital converter 45 (ADC). The analog-to-digital converter 45 supplies the digitized pixel signals to an image processor 50, which forms and outputs a digital image output.

As previously noted, a typical CMOS image sensor includes an array of pixels 20, arranged in a predetermined number of columns and rows. Generally, each pixel photosensor generates charge for a same amount of time and has an associated dynamic range. The dynamic range for an image sensor is commonly defined as the ratio of its largest non-saturating signal to the standard deviation of the noise under dark conditions. Dynamic range refers to the range of incident light that can be accurately sensed by an image sensor in a single frame of pixel data. It is desirable to have an image sensor with a high dynamic range in order to image scenes that generate high dynamic range incident signals, such as indoor rooms with windows to the outside, outdoor scenes with mixed shadows and bright sunshine, night-time scenes combining artificial lighting and shadows, and many others.

Dynamic range is limited on an upper end by the charge saturation level of the photosensor, and on a lower end by noise imposed limitations and/or quantization limits of the analog-to-digital converter used to convert the analog pixel output signals to digital signals. When the dynamic range of an image sensor is too small to accommodate the variations in light intensities of the imaged scene, image distortion occurs.

What is needed, therefore, is an image sensor, and methods of fabricating and operating the image sensor to achieve an improved dynamic range, which may be implemented using conventional CMOS processing techniques.

BRIEF SUMMARY OF THE INVENTION

The invention, in its apparatus and method aspects illustrated in the exemplary embodiments described herein, provides a readout technique and circuit for increasing or maintaining dynamic range of an image sensor. The readout technique and circuit process each pixel individually based on the magnitude of the readout signal. The circuit includes a gain amplifier amplifying the readout analog signal, a level detection circuit for determining the signal's magnitude, a second gain amplifier applying a gain based on the signal magnitude and an analog-to-digital converter digitizing the signal and a circuit for multiplying or dividing the signal. The method and circuit allow for a lower signal-to-noise ratio while increasing the dynamic range of the imager.

BRIEF DESCRIPTION OF THE DRAWINGS

The foregoing and other aspects of the invention will be better understood from the following detailed description of the invention, which is provided in connection with the accompanying drawings, in which.

DETAILED DESCRIPTION OF THE INVENTION

Figure 1:
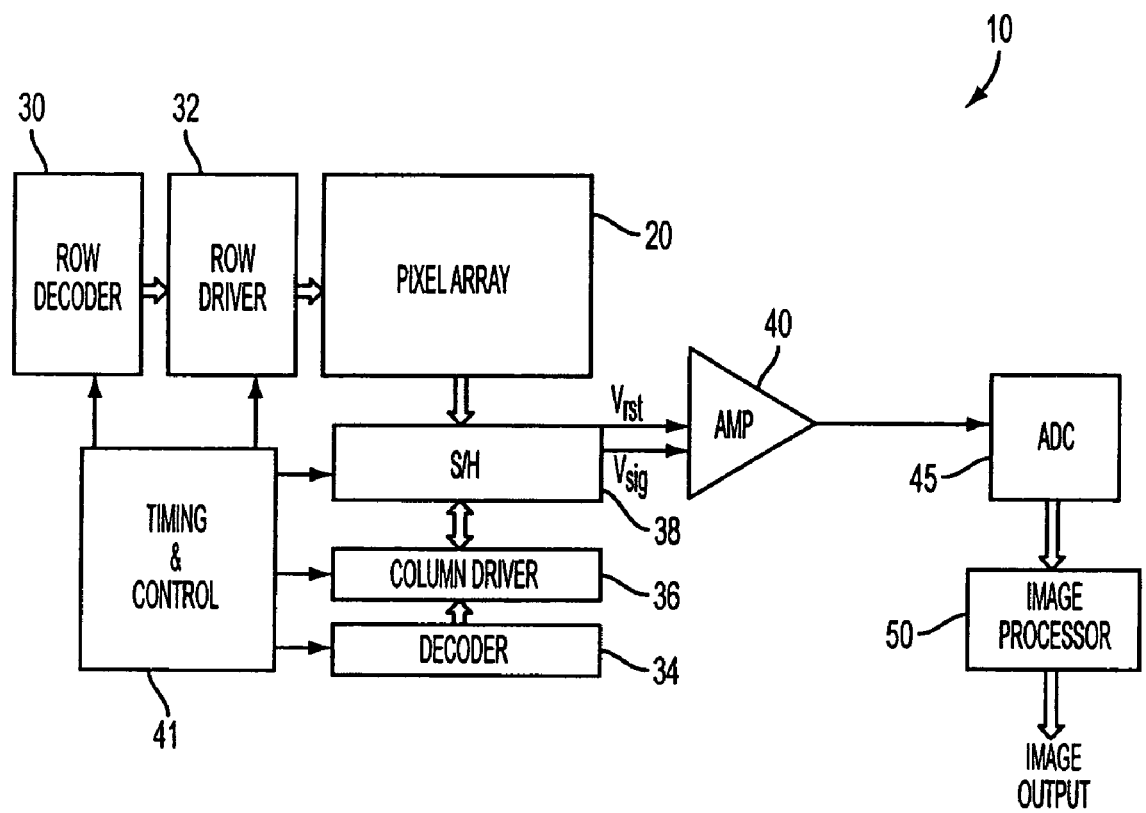
FIG. 1 is a schematic diagram of a conventional imager.

In the following detailed description, reference is made to the accompanying drawings, which form a part hereof and illustrate specific embodiments in which the invention may be practiced. In the drawings, like reference numerals describe substantially similar components throughout the several views. These embodiments are described in sufficient detail to enable those skilled in the art to practice the invention, and it is to be understood that other embodiments may be utilized, and that structural, logical and electrical changes may be made without departing from the spirit and scope of the present invention.

The term "pixel" refers to a picture element unit cell containing a photo-conversion device and transistors for converting electromagnetic radiation to an electrical signal. It should be appreciated, however, that the invention is not limited to any particular pixel type or configuration.

Typically, a high resolution analog-to-digital converter 45 (FIG. 1) is necessary to capture high dynamic range images in an image sensor 10. The signal to nose ratio (SNR) is usually limited by photon noise to approximately 40-45 dB. In accordance with exemplary embodiments of the present invention, and as described in more detail below, a lower resolution analog-to digital converter may be utilized, yet the invention provides a high dynamic range. Thereby, the dynamic range can be increased further by maintaining the higher resolution analog-to-digital converter. The invention achieves high dynamic range images by proper amplification of the output signal level of each individual pixel prior to analog-to-digital conversion.

The invention described herein may be applied to both differential (e.g., Vrst-Vsig) and single ended signals. Although the figures may indicate that the signal is differential, the invention is not limited to differential signals.

Figure 2:
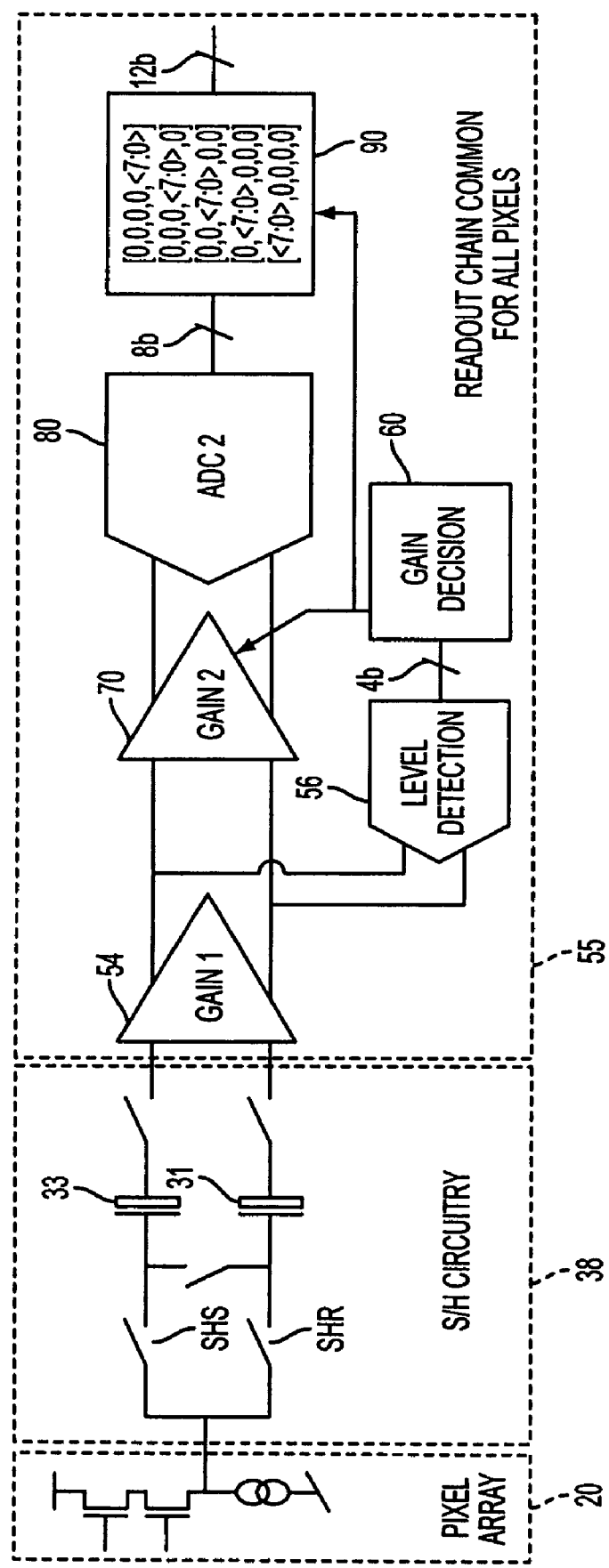
FIG. 2 is a block diagram illustrating a pixel readout circuit according to an exemplary embodiment of the invention.

FIG. 2 illustrates an exemplary pixel array readout chain 55 connected to sample hold circuitry 38, which is connected to one selected column of the pixel array 20 according to the invention. The sample hold circuit 38 samples and holds the output from each selected pixel column in the array 20. A reset signal is sampled and held in a first capacitor 31 when sample hold reset control signal SHR is generated. A photo signal is sampled and held in a second capacitor 33 when the sample hold control signal SHS is generated.

The sampled signals are processed by a first gain amplifier 54 of the readout chain 55, which amplifies the signal to the fullest extent possible while retaining a low noise performance. The amount of amplification of the signal is limited by the power supply rails. The gain GAIN1 of the first gain amplifier 54 may be programmable, for example, by an image processor 50 of FIG. 1, to compensate for image exposure and integration time. The magnitude of the signal output from the first gain amplifier 54 is determined by a level detection circuit 56. The level detection circuit 56 quantizes the pixel signal into levels (e.g., small, mid level or high). The number of different signal levels is variable and is determined based on the specific readout chain circuit 55 implementation. Gain decision logic 60 uses the signal magnitudes (e.g., small, mid-level, high) to set the gain GAIN2 of the second gain amplifier 70. The level detection circuit 56 and the gain decision logic 60 comprise a signal level determining circuit.

The gain GAIN2 settings of the second gain amplifier 70 depend on the resolution of analog-to-digital converter 80, as well as the desired overall dynamic range. Examples of the GAIN2 settings for amplifier 70 that could be used include 0.5, 1, 2, 4 and 8, depending on the number of signal levels which could be infinite. If the output of the first gain amplifier 54 is determined to be low, the gain GAIN2 of the second gain amplifier 70 is set high (e.g., 8). Conversely, if the output of the first gain amplifier 54 is determined to be high, the gain GAIN2 of the second gain amplifier 70 is set low (e.g., 0.5). The second gain amplifier 70 processes the differential signal Vrst-Vsig from amplifier 54. The analog-to-digital converter (ADC2) 80 digitizes the signal. After the signal is digitized, it is multiplied or divided by a factor which is also set by gain decision logic 60 and allows for an overall dynamic range increase without increasing the resolution of the analog-to-digital converter 80. The multiplication factor, for example, could be an inverse factor of the gain GAIN2 applied in the second gain amplifier 70. The multiplier factors are set based on the determined signal magnitude. Both the number of multipliers or divisors and the multiplier or divisor factors themselves may be set based on the specific imager application.

A description of an exemplary implementation of the readout circuit described above now follows.

The signals from each pixel stored in pixel array 20 are processed row-by-row and within each row, by the sample hold circuit 38, which is common to each pixel column. Each pixel outputs reset Vrst and photo Vsig signal outputs which are sampled and held in response to respective control signals SHR and SHS, into respective capacitors 31, 33. These signals are applied as a differential signal Vrst-Vsig to amplifier 54, which amplifies the differential signal by a gain GAIN1. The level of the signal output from the first gain amplifier 54 is determined by the level detection circuit 56. The levels assigned by the level detection circuit 56 could be low, 0.0V-0.25V, mid level, 0.25V-0.5V, and high, 0.5V-1V, corresponding to differential input signals. The signal level and the number of levels of analog-to-digital converter 56 can be set based on the implementation. If the gain decision logic 60 determines that the pixel output is high, a gain GAIN2 of 0.5 is applied in the second gain amplifier 70. Next, the signal is digitized into 8-bits by the analog-to-digital converter 80. The digital signal processed by analog-to-digital converter 80 is digitally multiplied by 24. When the pixel output is low, a gain GAIN2 of 8 is used in the second gain amplifier 70 and the signal is digitized into 8-bits in the analog-to-digital converter 80. The result is digitally multiplied by $2^0$. Alternatively, if the pixel output is mid level, a gain GAIN2 of 2 is used in the second gain amplifier 70 and the signal is digitized into 8-bits in the analog-to-digital converter 80. The signal is then digitally multiplied by $2^2$. The gains and multiplier factors applied in this example are only exemplary. The embodiments of the present invention allow for implementation different gains and multiplier factors to be used in the readout circuit based on the resolution of the analog-to-digital converter 80, desired dynamic range and the implementation application.

In this example, the readout chain 55 obtains a signal-to-noise ratio based on 8 bits, but a dynamic range of 12 bits. The number of bits implemented in the analog-to-digital converter 80 is application specific. When the image is digitized by a conventional 8-bit analog-to-digital converter, details in the dark spots are lost. However, the implementation of the readout circuit 55 allows for an image digitized by an 8-bit analog-to-digital converter 80 to keep the details in the darkest spots. This readout method allows for the digitizing of images and obtaining of a high dynamic range with a relatively low resolution analog-to-digital converter.

Therefore, complex and costly high resolution analog-to-digital converters are not need to produce a high dynamic range signal.

Figure 3:
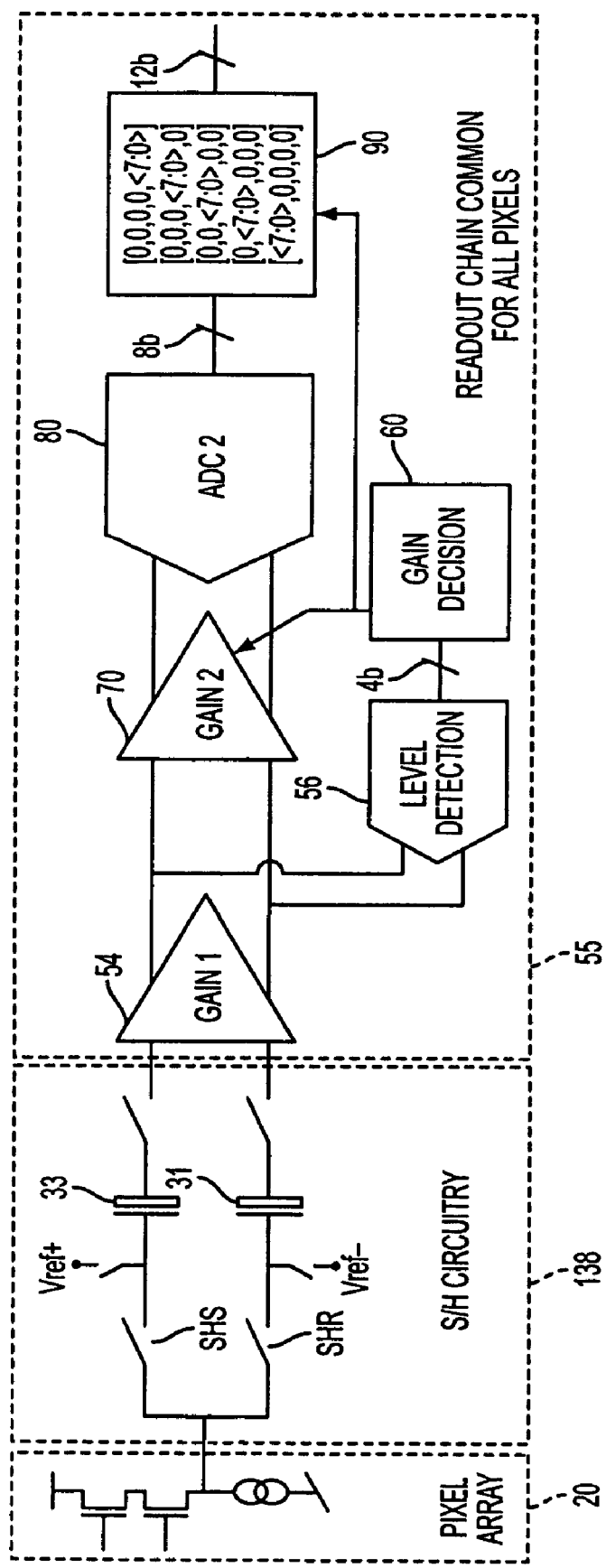
FIG. 3 is a block diagram illustrating a pixel readout circuit according to another exemplary embodiment of the invention.

Prior to amplification of the differential sampled signal by the first gain amplifier 54, an offset may be subtracted from the signal to further increase dynamic range. This is desirable in low voltage applications to achieve a greater signal to noise ratio. As one example of an offset, an offset amount equal to half of the full range of a single ended signal is subtracted from the signal. The sample and hold circuitry 138 can be modified as shown in FIG. 3 to accommodate this step. Alternatively, the offset could be subtracted before the signal is processed by amplifier 70 but after it has been processed by amplifier 54. The subtracted offset voltage can be predefined, programmable, or tunable.

Figure 4:
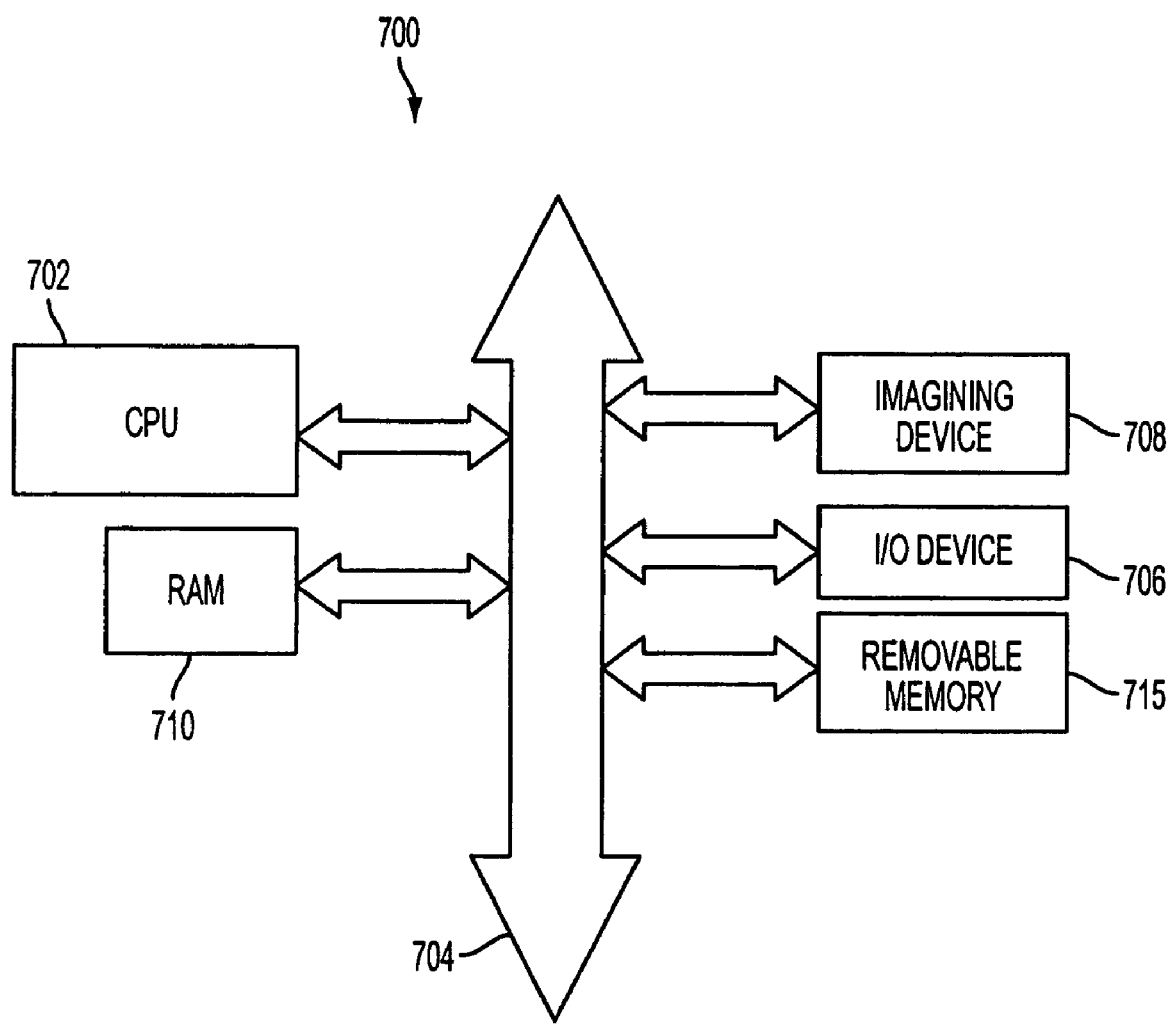
FIG. 4 shows a processor system incorporating at least one imaging device constructed in accordance with an embodiment of the invention.

FIG. 4 shows system 700, a typical processor system modified to include an imaging device 708 constructed in accordance with an embodiment of the invention. The processor-based system 700 is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, and image stabilization system, or other systems relying on an image input.

System 700, for example a camera system, generally comprises a central processing unit (CPU) 702, such as a microprocessor, that communicates with an input/output (I/O) device 706 over a bus 704. Imaging device 708 also communicates with the CPU 702 over the bus 704. The processor-based system 700 also includes random access memory (RAM) 710, and can include removable memory 715, such as flash memory, which also communicates with the CPU 702 over the bus 704. The imaging device 708 may be combined with a processor, such as a CPU, digital signal processor, or microprocessor, with or without memory storage on a single integrated circuit or on a different chip than the processor. It is also possible to integrate the CPU 702, RAM 710 and imaging device 708 on the same integrated circuit chip.

The above described invention can be implemented in any system providing an analog-to-digital conversion in which a dynamic range higher than the signal to noise ratio is desired. An exemplary implementation is in a swallowable pill as described in copending U.S. application 2003-0210439, herein incorporated by reference.

It should be appreciated that other embodiments of the invention include a method of fabricating the circuits of the invention as illustrated in FIGS. 2 and 3. For example, in one exemplary embodiment, a method of fabricating a pixel readout circuit comprises the acts of fabricating a first gain amplifier for amplifying a signal from a pixel array, fabricating a signal level determining circuit for determining a gain factor based on a level of the amplified signal, fabricating a second variable gain amplifier, connected to said signal level determining circuit, for amplifying the signal from the first gain amplifier using the determined gain factor and fabricating an analog-to-digital converter for digitizing an output of the second gain amplifier.

Furthermore, although the processes and device described above focus on increasing the dynamic range of an imager, the dynamic range may also be maintained with a lower resolution analog-to-digital converter by lowering other design constraints. For example, other design constraints that may be altered include power dissipation, bit rate after compression and the silicon area.

The processes and devices described above illustrate exemplary methods and typical devices of many that could be used and produced. The above description and drawings illustrate embodiments, which achieve the objects, features, and advantages of the present invention. However, it is not intended that the present invention be strictly limited to the above-described and illustrated embodiments. Any modification, though presently unforeseeable, of the present invention that comes within the spirit and scope of the following claims should be considered part of the present invention.

What is claimed as new and desired to be protected by Letters Patent of the United States is:

1. A pixel readout circuit for an imager comprising:
   a gain circuit comprising:
      a first gain amplifier for amplifying a signal from a pixel array;
      a signal level determining circuit for determining a gain factor based on a level of the amplified signal; and
      a second variable gain amplifier, connected to said signal level determining circuit, for amplifying the signal from the first gain amplifier using the determined gain factor; and
   an analog-to-digital converter for digitizing an output of the gain circuit.

2. The readout circuit according to claim 1, further comprising a circuit for multiplying or dividing an output of said analog-to-digital converter.

3. The readout circuit according to claim 1, wherein said signal level determining circuit further comprises:
   a level detection circuit for determining the signal magnitude of the signal outputted from the first gain amplifier; and
   a gain decision circuit for determining the gain to be applied in the variable gain amplifier based on the determined magnitude of the signal.

4. The readout circuit according to claim 1, wherein said first gain amplifier amplifies the signal to the maximum gain possible.

5. The readout circuit according to claim 2, wherein said signal, output from said analog-to-digital converter, is multiplied or divided based on the determined signal magnitude.

6. The readout circuit according to claim 1, wherein an offset is subtracted from the signal before the signal is processed by the first gain amplifier.

7. The readout circuit according to claim 6, wherein said offset is tunable.

8. The readout circuit according to claim 1, wherein an offset is subtracted from the signal after the signal is processed by the first gain amplifier.

9. The readout circuit according to claim 8, wherein said offset is tunable.

10. The readout circuit according to claim 1, wherein said pixel signal is single ended.

11. The readout circuit according to claim 1, wherein said pixel signal is differential.

12. An imager comprising:
   an array of pixels;
   a gain circuit comprising:
      a first gain amplifier amplifying a signal from said pixel array;
      a signal level determining circuit for determining a gain factor based on a level of the amplified signal;
      a variable gain amplifier, connected to said signal level determining circuit, for amplifying the signal from the first gain amplifier using the determined gain factor;

an analog-to-digital converter for digitizing an output of the gain circuit; and a circuit for multiplying or dividing the signal from said analog-to-digital converter.

13. The imager according to claim 12, wherein an offset is subtracted from the signal before the signal is processed by the first gain amplifier.

14. The imager according to claim 13, wherein said offset is equal tunable.

15. The imager according to claim 12, wherein an offset is subtracted from the signal after the signal is processed by the first gain amplifier.

16. The imager according to claim 15, wherein said offset is tunable.

17. A method of fabricating a pixel readout circuit comprising the acts of:

fabricating a gain circuit comprising:

fabricating a first gain amplifier for amplifying a signal from a pixel array;

fabricating a signal level determining circuit for determining a gain factor based on a level of the amplified signal; and fabricating a variable gain amplifier, connected to said signal level determining circuit, for amplifying the signal from the first gain amplifier using the determined gain factor; and fabricating an analog-to-digital converter for digitizing an output of the gain circuit.

* * * * *